US008070978B2

(12) United States Patent
Kaneko

(10) Patent No.: US 8,070,978 B2
(45) Date of Patent: *Dec. 6, 2011

(54) REFRIGERATOR OIL COMPOSITION

(75) Inventor: Masato Kaneko, Chiba (JP)

(73) Assignee: Idemitsu Kosan Co., Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 11/913,081

(22) PCT Filed: Aug. 28, 2006

(86) PCT No.: PCT/JP2006/316863
§ 371 (c)(1),
(2), (4) Date: Oct. 30, 2007

(87) PCT Pub. No.: WO2007/026646
PCT Pub. Date: Mar. 8, 2007

(65) Prior Publication Data
US 2009/0082237 A1    Mar. 26, 2009

(30) Foreign Application Priority Data
Aug. 31, 2005   (JP) ................. 2005-252641

(51) Int. Cl.
C09K 5/04    (2006.01)
C10M 145/02   (2006.01)
(52) U.S. Cl. ......................................... 252/68; 508/591
(58) Field of Classification Search .............. 252/68; 508/591
See application file for complete search history.

(56) References Cited

U.S. PATENT DOCUMENTS

| | | | | |
|---|---|---|---|---|
| 4,199,461 | A * | 4/1980 | Olund .......................... | 252/68 |
| 5,295,357 | A * | 3/1994 | Kaneko ........................ | 62/84 |
| 5,310,492 | A * | 5/1994 | Seiki et al. ................... | 252/68 |
| 5,403,503 | A * | 4/1995 | Seiki et al. ................... | 508/440 |
| 5,648,018 | A * | 7/1997 | Sabahi ......................... | 252/68 |
| 5,801,132 | A * | 9/1998 | Kaneko et al. ................ | 508/579 |
| 5,858,266 | A | 1/1999 | Kaneko | |
| 5,997,761 | A | 12/1999 | Kaneko | |
| 6,074,573 | A * | 6/2000 | Kaneko ......................... | 252/68 |
| 6,193,906 | B1 * | 2/2001 | Kaneko et al. ................ | 252/68 |
| 6,197,211 | B1 * | 3/2001 | Nakajima et al. ............ | 252/68 |
| 6,231,782 | B1 * | 5/2001 | Shimomura et al. .......... | 252/68 |
| 6,261,474 | B1 * | 7/2001 | Egawa et al. ................. | 252/68 |
| 7,824,567 | B2 * | 11/2010 | Kaneko ......................... | 252/68 |
| 7,914,697 | B2 * | 3/2011 | Kaneko ......................... | 252/68 |
| 2003/0055184 | A1 | 3/2003 | Song et al. | |
| 2007/0272893 | A1 * | 11/2007 | Kaneko ......................... | 252/68 |
| 2007/0290164 | A1 * | 12/2007 | Kaneko ......................... | 252/68 |
| 2008/0108850 | A1 * | 5/2008 | Nagao et al. ................. | 568/675 |
| 2008/0146469 | A1 * | 6/2008 | Sato et al. .................... | 508/110 |
| 2009/0000331 | A1 * | 1/2009 | Nagao et al. ................. | 62/498 |
| 2009/0062167 | A1 * | 3/2009 | Kaneko ......................... | 508/567 |
| 2009/0072187 | A1 * | 3/2009 | Kaneko ......................... | 252/68 |
| 2009/0090128 | A1 * | 4/2009 | Kaneko ......................... | 62/498 |
| 2010/0252772 | A1 * | 10/2010 | Kaneko ......................... | 252/68 |
| 2011/0136712 | A1 * | 6/2011 | Kaneko ......................... | 508/579 |

FOREIGN PATENT DOCUMENTS

| | | |
|---|---|---|
| EP | 0 467 345 A2 | 1/1992 |
| EP | 0 613 873 A2 | 9/1994 |
| EP | 0 989 179 A1 | 3/2000 |
| JP | 62 169898 | 7/1987 |
| JP | 02 140295 | 5/1990 |
| JP | 06 184576 | 7/1994 |
| JP | 08 135585 | 5/1996 |
| JP | 09 208980 | 8/1997 |
| JP | 11 106775 | 4/1999 |
| JP | 11 124590 | 5/1999 |
| JP | 2000 119671 | 4/2000 |
| JP | 2000 274360 | 10/2000 |
| JP | 2001-294886 | 10/2001 |
| JP | 2002 518582 | 6/2002 |

OTHER PUBLICATIONS

Reg. No. 173994-67-7, Mar. 8, 1996.*
Reg. No. 68649-11-6, Nov. 16, 1984.*
Reg. No. 151006-61-0, Nov. 5, 1993.*
Database WPI Week 199027, Thomson Scientific, XP002504416, May 29, 1990.
Yadav, Ganapati D. et al., Green Chemistry, "Development of a green process for poly-a-olefin based lubricants", 2002, vol. 4, pp. 528, 540.
Madgavkar, Ajay M. et al., Ind. Eng. Chem. Prod. Res. Dev., "Fixed-Bed Catalytic Process to Produce Synthetic Lubricants from Decene-1":, 1983, vol. 22., pp. 675-680.
Durasyn® 162 polyalphaolefin data sheet, http://www.ineosoligomers.com/189-PolyalphaAOlefinAProductAData.htm, 3 pps. SpectraSyn™ data sheet, http://www.exxonmobilchemical.com.cn/China-English/LCW/Products_Service/Synthetic_sSynthetic_Lubricants_and_Fluids/Grades_and_Datasheets/Synthetics_Polyalphaolefin_s_Grades_Overview.asp, 2 pps.
W. Kaminsky, et al., "Asymmetric Oligomerization of Propene and 1-Butene with a Zirconocene/Alumoxane Catalyst", Angew. Chem. Int., Ed. Engl., vol. 28, No. 9, 1989, pp. 1216-1218.
R. Shubkin, et al., "Olefin Oligomer Synthetic Lubricants: Structure and Mechanism of Formation", Ind. Engl. Chem. Prod. Res. Dev., 1980, pp. 15-19.
S. Randles, et al., "Synthetic Base Fluids", chemistry and Technology of Lubricants, pp. 32-37.

* cited by examiner

*Primary Examiner* — Douglas Mc Ginty
(74) *Attorney, Agent, or Firm* — Oblon, Spivak, McClelland, Maier & Neustadt, L.L.P.

(57) ABSTRACT

There is provided a refrigerating machine oil composition which has a low viscosity, an improved energy saving performance, a good sealability and an excellent loading endurance and, therefore, can be suitably used in various refrigerating application fields, in particular, in closed-system refrigerators. The refrigerating machine oil composition of the present invention comprises a base oil containing a hydrogenated α-olefin oligomer as a main component and having a kinematic viscosity of 1 to 8 mm$^2$/s as measured at 40° C., and is preferably applied to refrigerators having a sliding portion which is made of an engineering plastic material, or provided thereon with an organic coating film or an inorganic coating film.

17 Claims, No Drawings

REFRIGERATOR OIL COMPOSITION

This application is a 371 of PCT/JP06/316863 filed Aug. 28, 2006.

BACKGROUND OF THE INVENTION

1. Field of the Invention

The present invention relates to refrigerating machine oil compositions, and more particularly to refrigerating machine oil compositions having a low viscosity, an improved energy saving performance, a good sealability and an excellent loading endurance which are suitably used in various refrigerating application fields, in particular, closed-system refrigerators.

2. Description of Related Art

In general, compression-type refrigerators are constituted from at least a compressor, a condenser, an expansion mechanism (such as expansion valve), and an evaporator and/or a dryer, and have such a structure in which a mixed liquid composed of a refrigerant and a lubricant (refrigerating machine oil) is circulated through the closed system. In the compression-type refrigerators, in general, since an inside of the compressor is kept at a high temperature whereas an inside of the cooler is kept at a low temperature although these conditions vary depending upon kinds of refrigerators, it is required that the mixed liquid is circulated through the system without undergoing a phase separation thereof into the refrigerant and the lubricant over a wide temperature range of from the low temperature to the high temperature. The refrigerant and the lubricant in the mixed liquid generally have phase separation ranges on high-temperature and low-temperature sides, respectively. A maximum temperature in the low-temperature side phase separation range is preferably −10° C. or lower and more preferably −20° C. or lower whereas a minimum temperature in the high-temperature side phase separation range is preferably 30° C. or higher and more preferably 40° C. or higher. If the mixed liquid undergoes the phase separation during operation of the refrigerators, the life or operation efficiency of these apparatuses tends to be considerably adversely affected. For example, if the mixed liquid suffers from phase separation into the refrigerant and the lubricant in the compressor, poor lubrication occurs at a movable part thereof, resulting in defects such as seizing and, therefore, remarkably shortened life of the apparatuses. Whereas, if the phase separation occurs in the evaporator, a heat exchange efficiency of the apparatuses tends to be deteriorated owing to a high-viscous lubricant being present therein Hitherto, as the refrigerant for refrigerators, there have been mainly used chlorofluorocarbon (CFC), hydrochlorofluorocarbon (HCFC), etc. However, these compounds contain chlorine causing environmental problems. For this reason, there have been presently made studies for developing alternate refrigerants containing no chlorine such as hydrofluorocarbon (HFC). However, HFC has been reported to have adverse influence on global warming. Under these circumstances, there have been noticed so-called natural refrigerants suitable for environmental protection such as hydrocarbons, ammonia and carbon dioxide.

In addition, since the lubricant for refrigerators are used in order to lubricate movable parts thereof, it is also important that the lubricant has a good lubricating performance. In particular, since an inside of the compressor is likely to be kept at a high temperature, it is important that the lubricant has a viscosity capable of retaining an oil film required for a good lubrication. Although a necessary viscosity of the lubricant varies depending upon kinds of the compressor and use conditions thereof, the lubricant before mixing with the refrigerant preferably has a viscosity (kinematic viscosity) of 10 to 200 mm$^2$/s as measured at 40° C. It has been conventionally reported that if the viscosity of the lubricant is lower than the above specified range, a thickness of an oil film formed tends to be reduced, resulting in poor lubrication, whereas if the viscosity of the lubricant is higher than the above specified range, a heat exchange efficiency of the refrigerators tends to be lowered.

For example, there is disclosed a lubricant composition for vapor compression-type refrigerators using carbon dioxide as a refrigerant which comprises a lubricant base oil having a 10% distillation point of 400° C. or higher and a 80% distillation point of 600° C. or lower as measured by a gas chromatograph distillation method, a kinematic viscosity of 2 to 30 mm$^2$/s as measured at 100° C., and a viscosity index of 100 or more (e.g., refer to Japanese Patent Application Laid-open No. 294886/2001).

In Examples of the above Japanese Patent Application, it is described that the kinematic viscosity of the base oil used in the lubricant composition is in the range of from 17 to 70 mm$^2$/s as measured at 40° C.

The refrigerators using a refrigerating machine oil having such a high viscosity tend to inevitably suffer from a large energy consumption. Therefore, for the purpose of saving energy for the refrigerators, studies have been made to reduce a viscosity of the refrigerating machine oil and improve frictional properties upon the lubrication.

For example, in refrigerators for cold storage, an energy saving performance thereof has been improved by reducing a viscosity of the refrigerating machine oil used therein to VG32, 22, 15 and 10, respectively. However, when the viscosity of the refrigerating machine oil is further reduced, there tends to arise such a problem that a sealability and a lubricating property thereof are deteriorated.

SUMMARY OF THE INVENTION

The present invention has been made in view of the above conventional problems. An object of the present invention is to provide a refrigerating machine oil composition having a low viscosity, an improved energy saving performance, a good sealability and an excellent loading endurance which are suitably used in various refrigerating application fields, in particular, closed-system refrigerators.

As a result of intensive and extensive researches to develop refrigerating machine oil compositions having the above suitable properties, the inventors have found that the objects of the present invention can be achieved by using a base oil containing a hydrogenated α-olefin oligomer having a specific low viscosity as a main component. The present invention has been accomplished on the basis of the finding.

Thus, the present invention provides:

(1) A refrigerating machine oil composition comprising a base oil containing a hydrogenated α-olefin oligomer as a main component and having a kinematic viscosity of 1 to 8 mm$^2$/s as measured at 40° C.;

(2) the refrigerating machine oil composition described in the above aspect (1), wherein said base oil has a molecular weight of 140 to 660;

(3) the refrigerating machine oil composition described in the above aspect (1), wherein said base oil has a flash point of 100° C. or higher;

(4) the refrigerating machine oil composition described in the above aspect (1), wherein said hydrogenated a-olefin oligomer is produced by hydrogenating an oligomer of an α-olefin having 5 to 20 carbon atoms which is obtained by using a metallocene catalyst;

(5) the refrigerating machine oil composition described in the above aspect (1), which further comprises at least one additive selected from the group consisting of an extreme pressure agent, an oiliness agent, an antioxidant, an acid scavenger and a defoaming agent;

(6) the refrigerating machine oil composition described in the above aspect (1), wherein said composition is applied to a refrigerator using a hydrocarbon-based, carbon dioxide-based, hydrofluorocarbon-based or ammonia-based refrigerant;

(7) the refrigerating machine oil composition described in the above aspect (6), wherein said composition is applied to a refrigerator using a hydrocarbon-based refrigerant;

(8) the refrigerating machine oil composition described in the above aspect (6), wherein the refrigerator includes a sliding portion which is made of an engineering plastic material, or is provided thereon with an organic coating film or an inorganic coating film;

(9) the refrigerating machine oil composition described in the above aspect (8), wherein the organic coating film is a polytetrafluoroethylene coating film, a polyimide coating film or a polyamide imide coating film;

(10) the refrigerating machine oil composition described in the above aspect (8), wherein the inorganic coating film is a graphite film, a diamond-like carbon film, a tin film, a chromium film, a nickel film or a molybdenum film;

(11) the refrigerating machine oil composition described in the above aspect (1), wherein said composition is applied to various hot water supply systems or refrigerating and heating systems for air conditioners for automobiles, gas heat pumps, general-purpose air conditioning equipments, refrigerators, automatic vending machines or showcases; and

(12) the refrigerating machine oil composition described in the above aspect (11), wherein a water content in the systems is 60 ppm by mass or less, and a residual air content therein is 8 kPa or less.

EFFECT OF THE INVENTION

In accordance with the present invention, there is provided a refrigerating machine oil composition having a low viscosity, an improved energy saving performance, a good sealability and an excellent loading endurance which is suitably used in various refrigerating application fields, in particular, closed-system refrigerators.

DETAILED DESCRIPTION OF THE INVENTION

In the refrigerating machine oil composition of the present invention, there is used a base oil containing a hydrogenated a-olefin oligomer as a main component. The "hydrogenated α-olefin oligomer contained as a main component of the base oil" used herein means that the base oil contains the hydrogenated α-olefin oligomer in an amount of 50% by mass or more. The content of the hydrogenated α-olefin oligomer in the base oil is preferably 70% by mass or more, more preferably 90% by mass or more and still more preferably 100% by mass.

The base oil used in the present invention has a kinematic viscosity of 1 to 8 mm$^2$/s as measured at 40° C. When the base oil has a kinematic viscosity of 1 mm$^2$/s or more, the resultant refrigerating machine oil composition can exhibit a good loading endurance as well as a good sealability, whereas when the base oil has a kinematic viscosity of 8 mm$^2$/s or less, the resultant refrigerating machine oil composition can fully exhibit the effect of improving an energy saving performance. The kinematic viscosity of the base oil as measured at 40° C. is preferably from 1 to 6 mm$^2$/s and more preferably from 2 to 5 mm$^2$/s.

Also, the molecular weight of the base oil is preferably from 140 to 660, more preferably from 140 to 340 and still more preferably from 200 to 320. When the molecular weight of the base oil lies within the above-specified range, the base oil can exhibit a desired kinematic viscosity. The flash point of the base oil is preferably 100° C. or higher, more preferably 130° C. or higher and still more preferably 150° C. or higher. Further, as to the molecular weight distribution of the base oil, the ratio of a weight-average molecular weight of the base oil to a number-average molecular weight thereof is preferably 1.5 or less and more preferably 1.2 or less.

In the present invention, as far as the base oil can exhibit the above properties, the composition may also contain, in addition to the hydrogenated α-olefin oligomer, any other base oils in an amount of 50% by mass or less, preferably 30% by mass or less and more preferably 10% by mass or less. However, the refrigerating machine oil composition of the present invention still more preferably contains no other base oils than the hydrogenated α-olefin oligomer.

Examples of the other base oils usable in combination with the hydrogenated α-olefin oligomer include polyvinyl ethers, polyoxyalkylene glycol derivatives, ether compounds, mineral oils, alicyclic hydrocarbon compounds and alkylated aromatic hydrocarbon compounds.

In the present invention, the hydrogenated α-olefin oligomer used as a main component of the base oil is preferably produced by hydrogenating an oligomer of an α-olefin having 5 to 20 carbon atoms which is obtained using a metallocene catalyst.

Examples of the α-olefin having 5 to 20 carbon atoms include 1-hexene, 1-octene, 1-decene, 1-dodecene, 1-tetradecene, 1-hexadecene and 1-octadecene. Among these α-olefins, preferred are 1-hexene, 1-octene, 1-decene and 1-dodecene. These α-olefins may be used alone or in combination of any two or more thereof.

The hydrogenated α-olefin oligomer may be produced, for example, by the following method.

First, the above α-olefin is polymerized in the presence of a metallocene catalyst to obtain an oligomer of the α-olefin. As the metallocene catalyst, there is preferably used a combination of a complex having a conjugated carbon 5-membered ring which contains an element belonging to Group 4 of the Periodic Table, namely a metallocene complex, and an oxygen-containing organoaluminum compound.

Examples of the element belonging to Group 4 of the Periodic Table which is contained in the metallocene complex include titanium, zirconium and hafnium. Among these elements, preferred is zirconium. Also, as the complex having a conjugated carbon 5-membered ring, there are generally used complexes having a substituted or unsubstituted cyclopentadienyl ligand.

As the metallocene complex, there may be used those appropriately selected from the conventionally known compounds.

Examples of the suitable metallocene complex include bis(n-octadecyl cyclopentadienyl)zirconium dichloride, bis(trimethylsilyl cyclopentadienyl)zirconium dichloride, bis(tetrahydroindenyl)zirconium dichloride, bis[(t-butyldimethylsilyl)cyclopentadienyl]zirconium dichloride, bis(di-t-butylcyclopentadienyl)zirconium dichloride, (ethylidenebisindenyl)zirconium dichloride, biscyclopentadienyl zirconium dichloride, ethylidenebis(tetrahydroindenyl)zirconium dichloride and bis[3,3-(2-methyl-benzindenyl)]dimethylsilanediyl zirconium dichloride. These metallocene complexes may be used alone or in combination of any two or more thereof.

On the other hand, examples of the oxygen-containing organoaluminum compound include methyl alumoxane, ethyl alumoxane and isobutyl alumoxane. These oxygen-containing organoaluminum compounds may be used alone or in combination of any two or more thereof.

In the oligomerization reaction, it is not necessarily required to use a solvent. The oligomerization may be performed in a suspension, a liquid monomer or an inert solvent. In the case where the oligomerization is conducted in a solvent, as the solvent, there may be used, for example, benzene, ethyl benzene, toluene, etc. The oligomerization is preferably performed in the presence of an excess amount of the liquid monomer.

As the post-treatment of the oligomerization reaction, the catalyst is deactivated by any known method, e.g., by adding water or alcohols to the reaction system or by treating the catalyst with an acid containing no halogen, thereby stopping the oligomerization reaction.

The α-olefin isomers as side reaction products produced during the oligomerization stage may be removed by stripping after the oligomerization reaction. Alternatively, after subjecting the oligomerization reaction product to hydrogenation treatment without removing the α-olefin isomers therefrom, the α-olefin isomers may be removed upon distillation of the obtained hydrogenated oligomer.

The thus treated oligomerization reaction product is then treated with an aqueous alkali solution or an alcohol solution of alkali to wash out and remove the catalyst component therefrom.

The thus obtained α-olefin oligomer may be in the form of a dimer, a trimer or a tetramer. In the present invention, as the α-olefin oligomer, there is preferably used a 1-octene dimer, a 1-decene dimer, a 1-dodecene dimer or a mixture of these dimers.

The α-olefin oligomer produced in the presence of the metallocene catalyst contains double bonds, in particular, has a high content of terminal vinylidene double bonds. In the present invention, these double bonds are hydrogenated to convert the α-olefin oligomer into a saturated structure.

The hydrogenation treatment may be conducted in the presence of a known Ni- or Co-based catalyst or a noble metal-based catalyst such as Pd- and Pt-based catalysts. Examples of the hydrogenation catalysts include a diatomaceous earth-supported Ni catalyst, a cobalt trisacetyl acetonate/organoaluminum catalyst, an activated carbon-supported palladium catalyst and an alumina-supported platinum catalyst.

The hydrogenation may be usually conducted at a temperature of 200° C. or lower. More specifically, the hydrogenation temperature is about 150 to 200° C. when using the Ni-based catalyst, about 50 to 150° C. when using the noble metal-based catalyst such as Pd- and Pt-based catalysts, and about 20 to 100° C. when using a homogeneous reducing agent such as cobalt trisacetyl acetonate/organoaluminum. Also, the hydrogen pressure used in the hydrogenation reaction is from a normal pressure to about 20 MPa.

The thus obtained hydrogenated product is subjected to distillation treatment to obtain a fraction having a desired kinematic viscosity which is usable as the base oil of the present invention.

The refrigerating machine oil composition of the present invention may also contain at least one additive selected from the group consisting of an extreme pressure agent, an oiliness agent, an antioxidant, an acid scavenger and a defoaming agent.

Examples of the extreme pressure agent include phosphorus-based extreme pressure agents such as phosphates, acid phosphates, phosphites, acid phosphites and amine salts thereof.

Among these phosphorus-based extreme pressure agents, in view of a good extreme-pressure property and frictional properties, especially preferred are tricresyl phosphate, trithiophenyl phosphate, tri(nonylphenyl)phosphite, dioleyl hydrogen phosphite and 2-ethylhexyldiphenyl phosphite.

In addition, as the extreme pressure agent, there may also be used metal salts of carboxylic acids. The metal salts of carboxylic acids are preferably metals salts of carboxylic acids having 3 to 60 carbon atoms, more preferably metal salts of fatty acids having 3 to 30 carbon atoms, and still more preferably metal salts of fatty acids having 12 to 30 carbon atoms. Further examples of the extreme pressure agent include metal salts of dimer acids or trimer acids of these fatty acids as well as metal salts of dicarboxylic acids having 3 to 30 carbon atoms. Among these extreme pressure agents, preferred are metal salts of fatty acids having 12 to 30 carbon atoms and dicarboxylic acids having 3 to 30 carbon atoms.

Also, the metal element constituting the metal salts is preferably an alkali metal or an alkali earth metal and more preferably an alkali metal.

Examples of the other extreme pressure agents than those described above include sulfur-based extreme pressure agents such as sulfurized fats and oils, sulfurized fatty acids, sulfurized esters, sulfurized olefins, dihydrocarbyl polysulfide, thiocarbamates, thioterpenes and dialkylthiodipropionates.

The amount of the extreme pressure agent blended is usually from 0.001 to 5% by mass and preferably from 0.005 to 3% by mass on the basis of the total amount of the composition in view of lubricating property and stability.

These extreme pressure agents may be used alone or in combination of any two or more thereof.

Examples of the oiliness agent include aliphatic saturated or unsaturated monocarboxylic acids such as stearic acid and oleic acid, polymerized fatty acids such as dimer acids and hydrogenated dimer acids, hydroxy fatty acids such as ricinoleic acid and 12-hydroxystearic acid, aliphatic saturated or unsaturated monoalcohols such as lauryl alcohol and oleyl alcohol, aliphatic saturated or unsaturated monoamines such as stearyl amine and oleyl amine, aliphatic saturated or unsaturated monocarboxylic acid amides such as laurylamide and oleamide, and partial esters of a polyhydric alcohol such as glycerol and sorbitol with the aliphatic saturated or unsaturated monocarboxylic acid.

These oiliness agents may be used alone or in combination of any two or more thereof. The amount of the oiliness agent blended is usually from 0.01 to 10% by mass and preferably from 0.1 to 5% by mass on the basis of the total amount of the composition.

Examples of the antioxidant include phenol-based antioxidants such as 2,6-di-tert-butyl-4-methyl phenol, 2,6-di-tert-butyl-4-ethyl phenol and 2,2'-methylenebis(4-methyl-6-tert-butyl phenol) and amine-based antioxidants such as phenyl-α-naphthyl amine and N,N'-diphenyl-p-phenylene diamine. The amount of the antioxidant blended is usually from 0.01 to 5% by mass and preferably from 0.05 to 3% by mass on the basis of the total amount of the composition in view of good effects and economical advantages.

Examples of the acid scavenger include phenyl glycidyl ether, alkyl glycidyl ether, alkylene glycol glycidyl ether, cyclohexeneoxide, α-olefinoxide and epoxy compounds such as epoxidated soybean oil. Among these acid scavengers, phenyl glycidyl ether, alkyl glycidyl ether, alkylene glycol glycidyl ether, cyclohexeneoxide and α-olefinoxide are preferred in view of a good compatibility.

The alkyl group contained in the alkyl glycidyl ether and the alkylene group contained in the alkylene glycol glycidyl ether may be branched or unbranched, and respectively have usually 3 to 30 carbon atoms, preferably 4 to 24 carbon atoms and more preferably 6 to 16 carbon atoms. In the present invention, these acid scavengers may be used alone or in combination of any two or more thereof. The amount of the acid scavenger blended is usually from 0.005 to 5% by mass and preferably from 0.05 to 3% by mass on the basis of the total amount of the composition in view of good effects and prevention of formation of sludge.

In the present invention, the refrigerating machine oil composition can be improved in stability by blending the acid scavenger therein, and the stability of the refrigerating machine oil composition can be further improved by using the acid scavenger in combination with the extreme pressure agent and the antioxidant.

Examples of the defoaming agent include silicone oils and fluorinated silicone oils.

The refrigerating machine oil composition of the present invention may further contain various other known additives unless the addition thereof adversely affects the objects of the present invention. Examples of the other known additives include a steel deactivator such as N—[N,N'-dialkyl($C_3$ to $C_{12}$ alkyl)aminomethyl]tolutriazole.

The refrigerating machine oil composition of the present invention can be suitably applied to refrigerators using a hydrocarbon-based, carbon dioxide-based, hydrofluorocarbon-based or ammonia-based refrigerant, and in particular, to those refrigerators using a hydrocarbon-based refrigerant.

In the method of lubricating the refrigerators using the refrigerating machine oil composition of the present invention, various refrigerants and refrigerating machine oil compositions as described above may be used in such an amount that a mass ratio of the refrigerant to the refrigerating machine oil composition is from 99/1 to 10/90 and preferably from 95/5 to 30/70. When the amount of the refrigerant used is less than the above-specified range, the refrigerating performance tends to be deteriorated. When the amount of the refrigerant used is more than the above-specified range, the lubricating performance tends to be deteriorated. The refrigerating machine oil composition of the present invention can be applied to various refrigerators, in particular, can be suitably used in a compression refrigerating cycle of compression-type refrigerators.

The refrigerators to which the refrigerating machine oil composition of the present invention is applied has a refrigerating cycle essentially constituted from a compressor, a condenser, an expansion system (such as expansion valve) and an evaporator, or a compressor, a condenser, an expansion system, a dryer and an evaporator. In the refrigerators, there may be used the refrigerating machine oil composition of the present invention as a refrigerating machine oil as well as various refrigerants as described above.

The dryer is preferably filled with a drying agent made of zeolite having a pore diameter of 0.33 nm or less. Examples of the zeolite include natural zeolites and synthetic zeolites. The zeolite more preferably exhibits a $CO_2$ gas absorption capacity of 1.0% or less as measured at 25° C. under a $CO_2$ gas partial pressure of 33 kPa. Specific examples of the synthetic zeolite having such an absorption capacity include those available under tradenames "XH-9", "XH-600", etc., from Union Showa Co., Ltd.

In the present invention, when using such a drying agent, water is efficiently removed from the refrigerating cycle without absorbing the refrigerant present in the refrigerating cycle. At the same time, since such a drying agent is prevented by itself from being powdered owing to deterioration thereof, there can be avoided occurrence of clogging of conduits with the powder or abnormal wear due to intrusion of the powder into sliding portions of the compressor. As a result, the refrigerators can be stably operated for a long period of time.

In the refrigerators to which the refrigerating machine oil composition of the present invention is applied, various sliding portions (for example, bearings) are provided within the compressor thereof. In the present invention, these sliding portions are preferably made of an engineering plastic material, or provided thereon with an organic coating film or an inorganic coating film, in particular, in view of a good sealability.

Examples of the preferred engineering plastic material include polyamide resins, polyphenylene sulfide resins and polyacetal resins in view of good sealability, slidability and abrasion resistance.

Examples of the organic coating film include a fluorine-containing resin coating film (such as a polytetrafluoroethylene coating film), a polyimide coating film and a polyamide imide coating film in view of good sealability, slidability and abrasion resistance.

Examples of the inorganic coating film include a graphite film, a diamond-like carbon film, a nickel film, a molybdenum film, a tin film and a chromium film in view of good sealability, slidability and abrasion resistance. These inorganic coating films may be formed by either plating treatment or PVD (physical vapor deposition) method.

In addition, the sliding portions may be made of a conventional alloy material such as, for example, Fe-based alloys, Al-based alloys and Cu-based alloys.

The refrigerating machine oil composition of the present invention may be suitably used in various hot water supply systems or refrigerating and heating systems for air conditioners for automobiles, gas heat pumps, general-purpose air conditioning equipments, refrigerators, automatic vending machines or showcases.

In the present invention, the water content in these systems is preferably 60 ppm by mass or less and more preferably 50 ppm by mass or less. The residual air content in the systems is preferably 8 kPa or less and more preferably 7 kPa or less.

The refrigerating machine oil composition of the present invention is composed of a base oil containing a hydrogenated α-olefin oligomer as a main component thereof, and can exhibit a low viscosity, an improved energy saving performance and an excellent loading endurance.

EXAMPLES

The present invention will be described in more detail by referring to the following examples. However, it should be noted that these examples are only illustrative and not intended to limit the invention thereto. Meanwhile, various properties of the base oil as well as the refrigerating machine oil composition were measured by the following methods.
<Properties of Base Oil>
(1) 40° C. Kinematic Viscosity
Measured using a glass capillary viscometer according to JIS K2283-1983.

(2) Flash Point

Measured by C.O.C. method according to JIS K2265.

<Properties of Refrigerating Machine Oil Composition>

(3) Seizing Load

Measured using a Falex seizure tester according to ASTM D3233. The measurement for the seizing load was conducted under the following conditions:

Rotating speed: 290 rpm; material of a pin: AISIC 1137; material of a block: SAE3135; and blowing amount of a refrigerant (isobutane): 5 L/h.

(4) Sealed Tube Test

The catalyst composed of Fe, Cu and Al was charged into a glass tube. Further, a sample oil and a refrigerant (isobutane) were filled into the glass tube in such an amount that a ratio of the sample oil to the refrigerant was 4 mL/1 g, and then the glass tube was sealed. The contents in the glass tube were allowed to stand at 175° C. for 30 days, and then observed to evaluate or determine an appearance of each of the oil and the catalyst, occurrence or non-occurrence of sludge therein, and an acid value thereof.

(5) Short Circuit Test

Using a short circuit tester (reciprocating-type refrigerator; capillary length: 1 m), the 1000 h endurance test was conducted under the following conditions to measure a rate of decease in capillary flow amount after the test:

Discharge pressure $P_d$/suction pressure $P_s$: 3.3 MPa/0.4 MPa; discharge-side temperature $T_d$/suction-side temperature $T_s$: 110° C./30° C.; and sample oil amount/refrigerant ("R600a": isobutane) amount: 400 g/400 g.

(6) Sealability Comparison Test

Using various sliding members as a piston, blow-by gas amounts discharged from a clearance between the piston and cylinder were compared with each other. The respective blow-by gas amounts were expressed by an index calculated assuming that the blow-by gas amount obtained in Reference Example 1 was regarded as 10.

Examples 1 to 9 and Comparative Examples 1 to 3

The refrigerating machine oil compositions as shown in Table 1 were prepared, and subjected to measurement for seizing load thereof as well as the sealed tube test. The result are shown in Table 1.

TABLE 1

| | Examples | | | | | |
|---|---|---|---|---|---|---|
| | 1 | 2 | 3 | 4 | 5 | 6 |
| Sample oil No. | 1 | 2 | 3 | 4 | 5 | 6 |
| Content (% by mass) | | | | | | |
| Base oil A1 | 97.5 | | | 97.5 | | |
| Base oil A2 | | 97.5 | | | 97.5 | |
| Base oil A3 | | | 97.5 | | | 97.5 |
| Base oil B1 | | | | | | |
| Base oil B2 | | | | | | |
| Extreme pressure agent C1 | 1 | 1 | 1 | | | |
| Extreme pressure agent C2 | | | | 1 | 1 | 1 |
| Acid scavenger C3 | 1 | 1 | 1 | 1 | 1 | 1 |
| Antioxidant C4 | 0.5 | 0.5 | 0.5 | 0.5 | 0.5 | 0.5 |
| Defoaming agent C5 | 0.001 | 0.001 | 0.001 | 0.001 | 0.001 | 0.001 |
| Seizing load (N) | 2100 | 3150 | 2570 | 2330 | 3230 | 2760 |
| Results of sealed tube test | | | | | | |
| Appearance of oil | Good | Good | Good | Good | Good | Good |
| Appearance of catalyst | Good | Good | Good | Good | Good | Good |
| Occurrence of sludge | None | None | None | None | None | None |
| Acid value (mg KOH/g) | 0.01> | 0.01> | 0.01> | 0.01> | 0.01> | 0.01> |
| Appearance at −10° C. | Liquid | Liquid | Liquid | Liquid | Liquid | Liquid |

| | Examples | | | Comparative Examples | | |
|---|---|---|---|---|---|---|
| | 7 | 8 | 9 | 1 | 2 | 3 |
| Sample oil No. | 7 | 8 | 9 | 10 | 11 | 12 |
| Content (% by mass) | | | | | | |
| Base oil A1 | 98.0 | | | | | |
| Base oil A2 | | 98.0 | | | | |
| Base oil A3 | | | 98.0 | | | |
| Base oil B1 | | | | 97.5 | 100.0 | |
| Base oil B2 | | | | | | 98.0 |
| Extreme pressure agent C1 | 0.5 | 0.5 | | 1 | | 0.5 |
| Extreme pressure agent C2 | | | 0.5 | | | |
| Acid scavenger C3 | 1 | 1 | 1 | 1 | | 1 |
| Antioxidant C4 | 0.5 | 0.5 | 0.5 | 0.5 | | 0.5 |
| Defoaming agent C5 | 0.001 | 0.001 | 0.001 | 0.001 | | 0.001 |
| Seizing load (N) | 1800 | 2400 | 2210 | 260 | 250 | 1900 |
| Results of sealed tube test | | | | | | |
| Appearance of oil | Good | Good | Good | Good | Good | Good |
| Appearance of catalyst | Good | Good | Good | Good | Good | Good |
| Occurrence of sludge | None | None | None | None | None | None |

TABLE 1-continued

| | Examples | | | | | |
|---|---|---|---|---|---|---|
| Acid value (mg KOH/g) | 0.01> | 0.01> | 0.01> | 0.01> | 0.01> | 0.01> |
| Appearance at −10° C. | Liquid | Liquid | Liquid | Liquid | Liquid | Solid |

Note:
A1: Hydrogenated 1-octene dimer (produced using a metallocene catalyst); 40° C. kinematic viscosity: 2.78 mm$^2$/s; flash point: 132° C.; molecular weight: 226; molecular weight distribution: 1
A2: Hydrogenated 1-decene dimer (produced using a metallocene catalyst); 40° C. kinematic viscosity: 4.96 mm$^2$/s; flash point: 178° C.; molecular weight: 282; molecular weight distribution: 1
A3: Hydrogenated product of a reaction product of 1-octene and 1-decene (produced using a metallocene catalyst); 40° C. kinematic viscosity: 3.64 mm$^2$/s; flash point: 163° C.; molecular weight: 254; molecular weight distribution: 1.2
B1: Silicone oil; 40° C. kinematic viscosity: 10 mm$^2$/s
B2: n-Hexadecane
C1: Tricresyl phosphate
C2: Trithiophenyl phosphate
C3: C$_{14}$ α-olefinoxide
C4: 2,6-di-t-butyl-4-methylphenol
C5: Silicone-based defoaming agent From Table 1, it was confirmed that the refrigerating machine oil compositions obtained in Examples 1 to 9 according to the present invention all exhibited a high seizing load and good results of the sealed tube test as compared to those obtained in Comparative Examples 1 and 2. The refrigerating machine oil composition obtained in Comparative Example 3 had a relatively high seizing load, but was in a solid state at −10° C.

Examples 10 to 18 and Comparative Examples 4 to 6

The sample oils as shown in Table 2 were subjected to the short circuit test. The result are shown in Table 2.

TABLE 2

| | Examples | | | | | |
|---|---|---|---|---|---|---|
| | 10 | 11 | 12 | 13 | 14 | 15 |
| Sample oil No. | 1 | 2 | 3 | 4 | 5 | 6 |
| Conditions of short circuit test | | | | | | |
| Water content in system (ppm) | 30 | 30 | 30 | 50 | 50 | 30 |
| Residual air (kPa) | 4 | 4 | 4 | 4 | 6.7 | 6.7 |
| Results of short circuit test | | | | | | |
| Rate of decrease in capillary flow amount (%) | 3> | 3> | 3> | 3> | 3> | 3> |
| Appearance of oil | Good | Good | Good | Good | Good | Good |
| Acid value (mg KOH/g) | 0.01> | 0.01> | 0.01> | 0.01> | 0.01> | 0.01> |
| Remarks | | | | | | |

| | Examples | | | Comparative Examples | | |
|---|---|---|---|---|---|---|
| | 16 | 17 | 18 | 4 | 5 | 6 |
| Sample oil No. | 1 | 2 | 3 | 10 | 11 | 12 |
| Conditions of short circuit test | | | | | | |
| Water content in system (ppm) | 30 | 100 | 300 | 30 | 30 | 30 |
| Residual air (kPa) | 13 | 4 | 40 | 4 | 4 | 4 |
| Results of short circuit test | | | | | | |
| Rate of decrease in capillary flow amount (%) | 7 | 6 | 11 | — | — | — |
| Appearance of oil | Yellowish brown | Yellowish brown | Brown | — | — | — |

TABLE 2-continued

| | | | | | | |
|---|---|---|---|---|---|---|
| Acid value (mg KOH/g) | 0.03 | 0.02 | 0.07 | — | — | — |
| Remarks | | | | Comp. seized | Comp. seized | Capillary clogged |

From Table 2, it was confirmed that the refrigerating machine oil compositions obtained in Examples 10 to 15 exhibited a water content in system of less than 60 ppm by mass and a residual air content of less than 8 kPa and, therefore, showed good results of the short circuit test.

On the other hand, the refrigerating machine oil compositions obtained in Examples 16 to 18 exhibited either a water content in system of more than 60 ppm by mass or a residual air content of more than 8 kPa. Therefore, results of the short circuit test obtained in Examples 16 to 18 were slightly deteriorated as compared to those obtained in Examples 10 to 15.

Also, the refrigerating machine oil compositions obtained in Comparative Examples 4 to 6 suffered from seizing of the compressor or clogging of the capillary when subjected to the short circuit test.

Examples 19 to 22 and Reference Example 1

Using the sample oils as shown in Table 3, the sliding members as shown in Table 3 were subjected to the sealability comparison test. The result are shown in Table 3.

TABLE 3

| | Examples | | | | Reference Example |
|---|---|---|---|---|---|
| | 19 | 20 | 21 | 22 | 1 |
| Sample oil No. | 1 | 2 | 3 | 3 | 3 |
| Sliding member | D1 | D2 | D3 | D4 | D5 |
| Blow-by gas amount (relative amount) | 5 | 3> | 4 | 8 | 10 |

Note:
D1: Polyphenylene sulfide
D2: Fluorine-containing polymer coating film
D3: Polyamide-containing coating film
D4: Tin-plated film
D5: Aluminum alloy From Table 3, it was confirmed that the refrigerating machine oil compositions obtained in Examples 19 to 22 all exhibited a small blow-by gas amount and, therefore, a good sealability as compared to that obtained in Reference Example 1.

INDUSTRIAL APPLICABILITY

The refrigerating machine oil composition of the present invention has a low viscosity, an improved energy saving performance, a good sealability and an excellent loading endurance and, therefore, can be suitably used in various refrigerating application fields, in particular, in closed-system refrigerators.

What is claimed is:

1. A refrigerating machine oil composition comprising a base oil comprising a hydrogenated α-olefin oligomer as a main component and at least one additive selected from the group consisting of an extreme pressure agent, an oiliness agent, an antioxidant, an acid scavenger and a defoaming agent;

wherein
the hydrogenated α-olefin oligomer is obtained by hydrogenating an oligomer of an α-olefin having 5 to 20 carbon atoms which is obtained by oligomerization of an α-olefin having 5 to 20 carbon atoms in the presence of a metallocene catalyst,
a ratio of a weight-average molecular weight to a number-average molecular weight of the hydrogenated α-olefin oligomer is 1.5 or less, and
the hydrogenated α-olefin oligomer has a kinematic viscosity of 2.78 to 4.96 $mm^2/s$ as measured at 40° C. and has a flash point of 132 to 178° C.

2. The refrigerating machine oil composition according to claim 1, wherein the hydrogenated α-olefin oligomer has a molecular weight of 140 to 660.

3. The refrigerating machine oil composition according to claim 1, wherein the ratio of a weight-average molecular weight to a number-average molecular weight of the hydrogenated α-olefin oligomer is 1.2 or less.

4. The refrigerating machine oil composition according to claim 1, wherein the metallocene catalyst comprises:
a complex of a conjugated carbon 5-membered ring and an element of Group 4; and
an oxygen-containing organoaluminum compound.

5. The refrigerating machine oil composition according to claim 1, further comprising at least one additive selected from the group consisting of an extreme pressure agent, an oiliness agent, and a defoaming agent.

6. A refrigerant composition, comprising:
a refrigerating machine oil composition and a refrigerant selected from the group consisting of a hydrocarbon, a hydrofluorocarbon, carbon dioxide, and ammonia,
wherein the refrigerating machine oil composition comprises a base oil comprising a hydrogenated α-olefin oligomer as a main component;
and wherein
the hydrogenated α-olefin oligomer is obtained by hydrogenating an oligomer of an α-olefin having 5 to 20 carbon atoms which is obtained by oligomerization of an α-olefin having 5 to 20 carbon atoms in the presence of a metallocene catalyst,
a ratio of a weight-average molecular weight to a number-average molecular weight of the hydrogenated α-olefin oligomer is 1.5 or less, and
the hydrogenated α-olefin oligomer has a kinematic viscosity of 2.78 to 4.96 $mm^2/s$ as measured at 40° C. and has a flash point of 132 to 178° C.

7. The refrigerant composition according to claim 6, wherein the refrigerant is a hydrocarbon.

8. A refrigerator, comprising the refrigerant composition according to claim 6, wherein the refrigerator has at least one sliding portion which is made of an engineering plastic material, or provided thereon with an organic coating film or an inorganic coating film.

9. The refrigerator according to claim 8, wherein the refrigerator has at least one sliding portion which is provided thereon with an organic coating film, and wherein the organic coating film is a polytetrafluoroethylene coating film, a polyimide coating film or a polyamide imide coating film.

10. The refrigerator according to claim 8, wherein the refrigerator has at least one sliding portion which is provided thereon with an inorganic coating film, and wherein the inorganic coating film is a graphite film, a diamond-like carbon film, a tin film, a chromium film, a nickel film or a molybdenum film.

11. A heating or cooling system comprising the refrigerating machine oil composition according to claim 1, wherein the heating or cooling system is one selected from the group consisting of a hot water supply system, a refrigerating and heating system for an automobile air conditioner, a gas heat pump, a general-purpose air conditioning equipment, a refrigerator, an automatic vending machine and a showcase.

12. The heating or cooling system according to claim 11, wherein a water content of the refrigerating machine oil composition is 60 ppm by mass or less, and a residual air content is 8 kPa or less.

13. The refrigerating machine oil according to claim 4, wherein the Group 4 element is at least one selected from the group consisting of titanium, zirconium and hafnium.

14. The refrigerating machine oil according to claim 4, wherein the Group 4 element is zirconium.

15. The refrigerating oil composition according to claim 4, wherein the metallocene catalyst is selected from the group consisting of bis(n-octadecyl cyclopentadienyl)zirconium dichloride, bis(trimethylsilyl cyclopentadienyl)zirconium dichloride, bis(tetrahydroindenyl)zirconium dichloride, bis [(t-butyldimethylsilyl)cyclopentadienyl]zirconium dichloride, bis(di-t-butylcyclopentadienyl)zirconium dichloride, (ethylidene-bisindenyl)zirconium dichloride, biscyclopentadienyl zirconium dichloride, ethylidenebis(tetrahydroindenyl)zirconium dichloride, bis[3,3-(2-methyl-benzindenyl)] dimethylsilanediyl zirconium dichloride and a mixture thereof.

16. The refrigerating oil composition according to claim 4, wherein the oxygen-containing organoaluminum compound is selected from methyl alumoxane, ethyl alumoxane, isobutyl alumoxane and a mixture thereof.

17. The refrigerating machine oil composition according to claim 1, wherein the hydrogenated $\alpha$-olefin oligomer comprises a hydrogenated $\alpha$-olefin dimer.

* * * * *